July 31, 1956 C. F. WILDE, JR 2,756,866
INTERNAL DRAG BULK CONVEYOR
Filed May 16, 1955 2 Sheets-Sheet 1
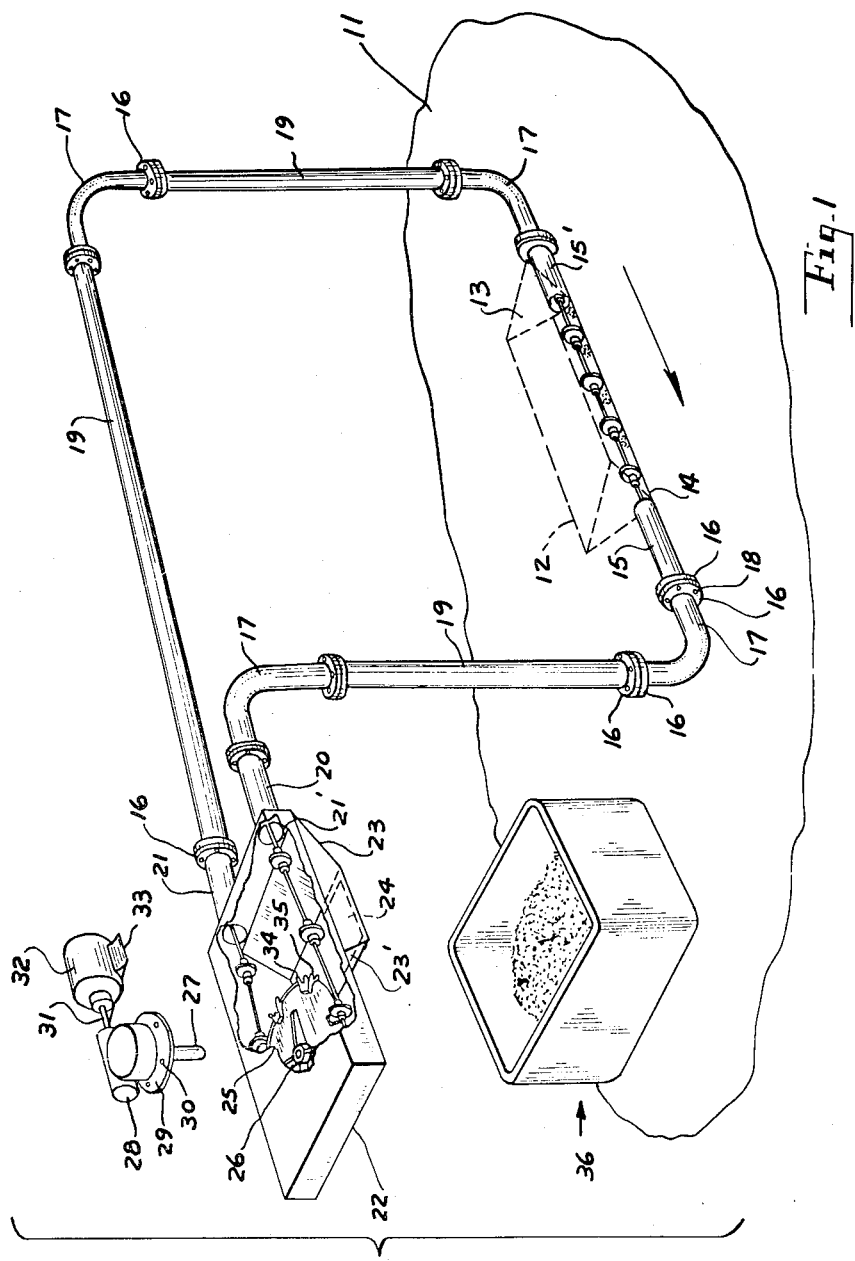
INVENTOR.
CURTIS F. WILDE, JR.
BY
Robert A. Sloman
ATTORNEY July 31, 1956  C. F. WILDE, JR  2,756,866
INTERNAL DRAG BULK CONVEYOR
Filed May 16, 1955  2 Sheets-Sheet 2
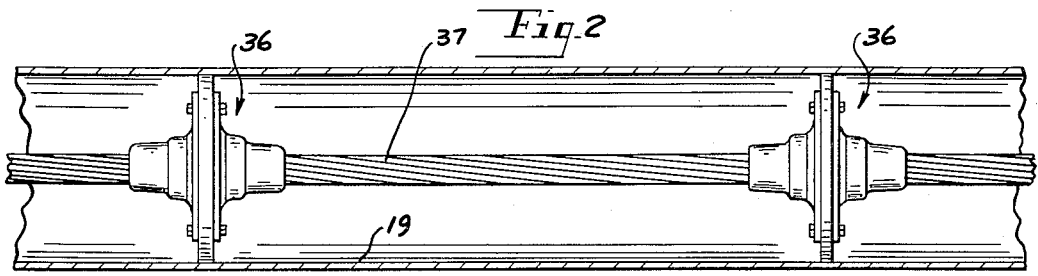
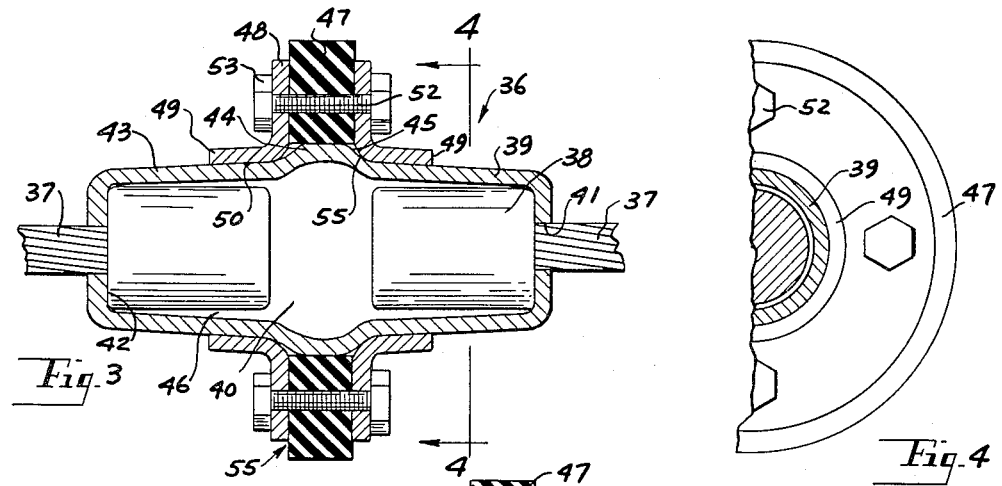
INVENTOR.
CURTIS F. WILDE, JR.
BY
Robert A. Sloman
ATTORNEY.

2,756,866

INTERNAL DRAG BULK CONVEYOR

Curtis F. Wilde, Jr., Detroit, Mich., assignor of one-half each to Francis A. Schmieg, Birmingham, and Donald D. Zebley, Detroit, Mich.

Application May 16, 1955, Serial No. 508,510

11 Claims. (Cl. 198—168)

This invention relates to conveyors and more particularly to an internal drag bulk conveyor such as might be used for conveying grain or waste material through a conduit.

It is the primary object of the present invention to provide a novel internal drag type conveyor which consists of a series of conveyor flights arranged in equally spaced relation and interconnected upon their opposite sides by flexible cable segments.

It is the further object of the present invention to provide a novel conveyor flight construction wherein a pair of relatively short cable elements are interconnected to provide in addition to such interconnection a bulk conveyor device movable upon the interior of a tube.

It is the object of the present invention to provide an internal drag type conveyor movable within a tube wherein the respective interconnected segments of the conveyor between the equally spaced flights thereof are flexibly interconnected whereby the tubular element may extend in any direction from adjacent portions thereof throughout any angle substantially throughout 360 degrees.

It is the further object of the present invention to provide a novel type of conveyor construction together with novel means for interconnecting a series of flexible elements forming a portion of the conveyor.

These and other objects will be seen from the following specification and claims in conjunction with the appended drawings, in which:

Fig. 1 is a perspective partially fragmentary illustration of the present internal drag type bulk conveyor, with portions thereof shown in exploded relation, for illustration.

Fig. 2 is a fragmentary side elevational view partially in section of a segment of the tubing with a fragment of the conveyor movably positioned therein, all on an enlarged scale.

Fig. 3 is an elevational section of one conveyor flight upon an enlarged scale.

Fig. 4 is a fragmentary section taken on line 4—4 of Fig. 3.

Fig. 5 is a front elevational view of one of the flight securing washers.

Fig. 6 is a section taken on line 6—6 of Fig. 5; and

Fig. 7 is a view similar to Fig. 3 illustrating a ball and socket connection between a conveyor flight and adjacent cable element.

It will be understood that the above drawings illustrate merely a preferred embodiment of the invention and that other embodiments are contemplated within he scope of the claims hereafter set forth.

Referring to Fig. 1, the perspective view illustrates one use to which the present internal drag bulk conveyor might be applied such as the continuous movement through a tubular element within the floor of a factory, for illustration, for transmitting steel chips or scrap as it falls from a specifically located machine tool adjacent a portion of the conveyor mechanism. It is contemplated that while only one inlet is shown in the drawing for the introduction of waste material or bulk scrap chips, nevertheless, there may be formed within a portion of the conveyor a series of such inlets.

Referring to Fig. 1, the floor of a building is fragmentarily illustrated at 11, and positioned down thereinto is a bin-like element 12 whose top surface is covered by a suitable grill 13 which is co-planer with the ground surface. The bin is preferably of V shape in cross-section whereby any scrap material or chips dropped through the grill will collect at the apex portion 14 of the said bin through which a portion of the conveyor mechanism movably extends as now described.

At the forward end of the bin and adjacent apex 14 there is connected the tube 15 which has a circular flange 16 at its free end and which cooperatively registers with a corresponding circular flange 16 on the elbow 17 with the said flanges secured together as by fasteners 18.

Said elbow connects the conduit 19 which also has a similar set of securing flanges at 16 at its opposite ends as do all of the elements of the tubular member, hereafter described. Conduit element 19 terminates in the elbow 17 which is connected with the conduit 20. The end of said conduit projects as at 21' into the upper portion of the delivery bin 23, whose opposite walls are tapered inwardly and downwardly, which bin terminates in the rectangularly shaped elongated outlet 24 which is directly above the portable storage container 36.

The conduit for the complete conveyor mechanism is necessarily continuous and accordingly there projects from the casing 22 which forms a part of bin 23, the conduit 21, which is in parallel relation to conduit 20 and which is joined at its flange 16 to another conduit 19. This conduit in turn through elbow 17 joins conduit 19 and the adjacent elbow 17. The said elbow through the short conduit 15' again joins the apex portion 14 of the bin 12 at the lower end thereof opposite from the outlet conduit 15 shown in Fig. 1.

Consequently, there is provided a continuous tube, which in the preferred embodiment shows merely one bin 12 into which bulk material may be dropped for transmission through portions of the conduit up into the disposal bin 23.

It is contemplated that throughout the length of said conduit 15—19—17—21—19—17—19—17—15' there may be any desired number of stations or points where there may be additional bins 12 for the receipt of material to be transported by the conveyor mechanism to a central disposal area.

Horizontally positioned within the rectangularly shaped housing 22 which communicates with the upper portion of bin 23 there is rotatively positioned a sprocket type of drive plate 25 for the conveyor mechanism, which has a central hub 26 adapted for positioning over the depending driven shaft 27 of speed reducer 28.

Said speed reducer has a circular flange 29 adapted for positioning upon the top wall of housing 22 and may be secured thereto as at the securing points 30 formed in flange 29, and with shaft 27 in driving and in supporting relation with respect to sprocket drive 25.

Drive shaft 31 from motor 32 projects into speed reducer 28. The motor 32 also has mounting flanges 33 whereby the same may be also mounted upon the top wall of housing 22 and immovably secured thereon to thus provide an effective driving mechanism through the said motor and speed reducer for the sprocket 25 in conjunction with the conveyor mechanism hereafter described. The sprocket 25 has formed in its exterior periphery a plurality of spaced sprocket elements 34 whose opposite outwardly projecting ends are bifurcated as at 35 for cooperatively receiving portions of the conveyor flights in the manner hereafter described.

Referring to Fig. 2, there is shown on an enlarged scale a portion of conduit 19 which, for illustration, may be any portion throughout the length of the continuous conduit forming a part of the present internal drag conveyor.

The conveyor flights generally indicated at 36 are equally spaced by a series of flexible cable elements 37 which are joined at their respective opposite ends through the flights 36, in the manner now to be described, in conjunction with Figs. 3, 4, 5 and 6.

Referring to these latter figures, there is shown in Fig. 3 a single flight 36 upon an enlarged scale by which a pair of cable elements 37 are spliced together to form a part of the continuous cable and providing a means for securing the annular washer 47 which moves upon the interior of the conduit 19 in sliding relation with the interior wall portions thereof for moving bulk material along the interior of the conduit.

Upon the opposite ends of the flexible cables 37 which, in the preferred embodiment, are 12 inches in length, are suitably secured as by swedging the enlarged heads 38 of cylindrical shape. The flight mechanism includes a pair of symmetrical mating casings 39 which are adapted to be positioned together in mating and opposed relation to provide an enclosed housing for retainingly securing the enlarged heads 38 upon the ends of an adjacent pair of cable elements 37. The said assembly also has mounted thereon in the manner hereafter described, a rubber of neoprene washer 47 which is arranged transversely of the length of the assembled casing and intermediate the ends thereof and which is clamped to the casing as by the opposed washers 48 and the bolts 52.

Each of the pair of casings 39 are substantially semi-circular in cross-sectional shape, and each include the upright walls 42 at their opposite ends which have formed therethrough semi-circular recesses 41 adapted to receive portions of the cable elements 37. The end walls terminate in the outwardly converging or tapered opposed side wall portions 43 which terminate at their inner ends in the semi-circular enlarged shoulder 44, the shoulder of each of the said casing halves cooperating to provide an annular support for the flexible washer 47 which is positioned thereover in the manner shown in Fig. 3.

The outer marginal portions of the hub-like element 44 define semi-circular abutment surfaces 45 upon opposite sides of said hub against which the opposed symmetrical oppositely arranged washers 48 cooperatively bear.

There is thus formed within each of the casing halves 39 an elongated hollow cavity 40 within which are nested the enlargements or heads 38 upon the ends of the cable elements 37, which enlargements are retained within the casing halves 39 when the same are secured together by said washers, the end walls of said heads cooperatively bearing against the end walls 42 of the casing halves. There is provided an inwardly tapered space 46 which extends around the heads 38 to thereby permit a degree of flexibility or a slight movement of the said heads within the casing upon any bending of the cable elements 37, such as when the conveyor mechanism is passing through a curved portion of conduit 17, for example.

The circular washer 47 has a central transverse bore of such dimension as to cooperatively fit over the annular hub 44 defined by the mating casings 39; and said washer, constructed of a flexible material such as rubber or neoprene, is adapted for sliding movement upon the interior of conduit 19, for example, so as to propel and to displace any bulk material within the conduits 19, for illustration, for transmitting the same to the delivery bin 23.

The opposed annular washers or sleeves 48 are arranged upon opposite sides of the flexible washer 47 in opposed relation, the said retaining washers 47 at their inner ends terminating in oppositely arranged radial annular flanges 49 which are tapered as at 50 so as to cooperatively engage the exterior tapered surface portions 43 of the casing halves. The central annular interior corner portions 55 of the said washers 48 cooperatively and retainingly engage the shoulder portions 45 or abutment surfaces which form a part of the annular washer supporting element 44 defined by the pair of casing elements.

A plurality of spaced transverse apertures 51 are formed through the retaining washers 48 and are arranged in axial alignment to cooperatively receive the plurality of bolts 52, which extend through registering transverse slots 54 in the rubber washer 47, which bolts are secured in assembled relation by the nuts 53 to thereby complete the assembly.

The said casing by which the cable heads 38 are secured in axial alignment to thereby complete the formation of the continuous conveyor, are held in assembled relation by the opposed metallic retaining washers 48 and the corresponding bolts and nuts.

As the said washers 48 are drawn together by the said bolts, the tapered surfaces 50 forming a part of the annular flanges 49 cooperatively and compressively engage portions 43 of the said casings for effectively securing them together in opposed relation. At the same time, there is provided an effective means for axially mounting upon the said assembled casing the conveyor washer 47 which is arranged transversely of the length of the cable elements and which is adapted to sweepingly engage the interior surface of the conveyor tubing 19 in the manner illustrated in Fig. 2.

As shown in Fig. 3, the rubber washer 47 extends radially outward beyond the edges of the metallic washers 48 as indicated at 55 so that there is always a loose contact or engagement of the rubber washer 47 with respect to the interior wall of the conduit 19, to thus prevent unnecessary wear thereof.

By this construction it is extremely easy to replace an individual cable element 37 should there be a breakdown, without disassembling the complete conveyor mechanism.

In the preferred embodiment of the invention, the parts which make up the conveyor flights 36 are essentially stampings to thereby provide a novel and inexpensive construction. In view of the opposed shoulders 45 on the hub 44, it is apparent that the said shoulders will cooperate with the abutment elements 55 on washers 48 whereby longitudinal pulling forces may be transmitted in either direction.

A slight variation of the present invention and the flight construction is illustrated in Fig. 7.

In this connection the flight includes a casing formed of a pair of symmetrical opposed casing elements 56 which also have a central annular hub formation for mounting the flexible washer 47 the same as the construction shown in Fig. 3.

The only difference in the construction of Fig. 7 resides in the fact that the end walls are tapered as at 57 and terminate in the axial enlarged openings 58 at opposite ends of the casing to provide a substantial clearance with respect to the cable elements 59.

There is provided a ball and socket connection between the cable elements and the casing by forming the heads 60 of a tapered construction and with rounded leading edges as at 61, so as to slidably and cooperatively engage the inner surface portions of the curved end walls 57. Thus there is provided a greater degree of flexibility between the cable elements 59 and the said casing, inasmuch as in view of the enlarged openings 58 the cable may assume the relative dotted line position shown at 59' and at the same time the head 60 is free to rotate within its socket mounting. Thus there may be a pull at different angles without imparting unusual or unnecessary strain to the casing in view of the ball and socket connection between the heads 60 and the casing end walls.

Having described my invention, reference should now be had to the claims which follow for determining the scope thereof.

I claim:

1. An internal drag bulk conveyor comprising a continuous tube, and a continuous conveyor movable therein, said conveyor consisting of a series of flexible cable elements, enlarged heads upon opposite ends thereof, a casing retainingly receiving the heads of an adjacent pair of cable elements, said casing including a pair of opposed symmetrical casing halves with registering recesses in their opposing end walls to receive the cable elements, said casing halves having central exterior shoulders of increased diameter intermediate their ends defining an annular seat, a flexible washer mounted upon said seat adapted for sliding engagement with the interior of said tube, a pair of spaced opposed sleeves mounted over said casing halves retainingly engaging opposite edges of said seat, and having opposed radial annular flanges engaging opposite sides of the flexible washer, and means compressively securing said flanges and washer together.

2. The internal drag conveyor of claim 1, the annular wall portions of the assembled casing tapering outwardly towards said seat, said sleeves being correspondingly tapered for cooperative engagement therewith.

3. The conveyor of claim 1, the outer annular edges of said seat defining abutment surfaces, the annular corners formed in said sleeves by their flanges retainingly engaging said abutment surfaces for securing the casing halves together.

4. The conveyor of claim 1, the peripheral portions of the flexible washer extending radially outward of the peripheral edges of said flanges.

5. The conveyor of claim 1, portions of said heads being spaced inwardly of the annular wall portions of said casing to facilitate flexing movements of the cable elements and corresponding movements of the said heads within the casing.

6. In an internal drag bulk conveyor including a series of short flexible aligned cable elements with enlarged heads on their respective ends, a casing retainingly receiving the heads of an adjacent pair of elements, said casing including a pair of opposed symmetrical casing halves with registering recesses in their opposing end walls to receive the cable elements, said casing halves having central exterior shoulders of increased diameter intermediate their ends defining an annular seat, a flexible washer mounted upon said seat, a pair of spaced opposed sleeves mounted over said casing halves retainingly engaging opposite edges of said seat, and having opposed radial annular flanges engaging opposite sides of the flexible washer, and means compressively securing said flanges and washer together.

7. In combination, a casing including a pair of opposed symmetrical casing halves with registering recesses in their opposing end walls adapted to receive portions of a pair of cable elements, enlarged cylindrical heads upon said cable elements nested within said casing, said casing halves having central exterior shoulders of increased diameter intermediate their ends defining an annular seat, a flexible washer mounted upon said seat, a pair of spaced opposed sleeves mounted over said casing halves retainingly engaging opposite edges of said seat, and having opposed radial annular flanges engaging opposite sides of the flexible washer, and means compressively securing said flanges and washer together.

8. The combination of claim 7, the annular wall portions of the assembled casing tapering outwardly towards said seat, said sleeves being correspondingly tapered for cooperative engagement therewith.

9. The combination of claim 7, the outer annular edges of said seat defining abutment surfaces, the annular corners formed in said sleeves by their flanges retainingly engaging said abutment surfaces for securing the casing halves together.

10. The conveyor of claim 1, the end walls of said casing halves being curved upon their interior to define sockets, the recesses in said end walls being oversize with respect to the cable elements, said heads having spherical end portions cooperatively engaging said sockets whereby said cable elements and heads are adapted for flexing movements with respect to said casing.

11. In combination with a pair of aligned flexible cable elements having enlarged heads thereon, a casing adapted to retainingly receive the heads of an adjacent pair of cable elements, said casing including a pair of opposed symmetrical casing halves with registering recesses in their opposing end walls to receive the cable elements, said casing halves having central exterior shoulders of increased diameter intermediate their ends defining an annular seat, a flexible washer mounted upon said seat, a pair of spaced opposed sleeves mounted over said casing halves retainingly engaging opposite edges of said seat, and having opposed radial annular flanges engaging opposite sides of the flexible washer, and means compressively securing said flanges and washer together.

References Cited in the file of this patent

UNITED STATES PATENTS 499,525    Dodge _____ June 13, 1893